United States Patent
Fu et al.

(10) Patent No.: US 11,175,877 B2
(45) Date of Patent: Nov. 16, 2021

(54) METHOD AND DEVICE FOR SCREEN PROJECTION, TERMINAL AND STORAGE MEDIUM

(71) Applicant: BEIJING XIAOMI MOBILE SOFTWARE CO., LTD., Beijing (CN)

(72) Inventors: Kaipeng Fu, Beijing (CN); Yijing Liao, Beijing (CN); Jianjiang Qu, Beijing (CN); Ming Liu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 0 days.

(21) Appl. No.: 16/690,749

(22) Filed: Nov. 21, 2019

(65) Prior Publication Data

US 2021/0064323 A1    Mar. 4, 2021

(30) Foreign Application Priority Data

Aug. 28, 2019  (CN) .......................... 201910802713.2

(51) Int. Cl.
*G06F 3/14* (2006.01)
*G06F 3/147* (2006.01)
*G09G 5/00* (2006.01)

(52) U.S. Cl.
CPC ............ *G06F 3/1454* (2013.01); *G06F 3/147* (2013.01); *G09G 5/003* (2013.01); *G09G 2340/0492* (2013.01)

(58) Field of Classification Search
CPC ... H04N 21/440263; H04N 21/442224; H04N 21/42204; H04N 21/4126; H04N 21/43637; H04N 21/4227; H04N 21/4122; G06F 3/1462; G06F 3/1454; G06F 3/147; G06F 13/14; G09G 5/003; G09G 2370/06;

(Continued)

(56) References Cited

U.S. PATENT DOCUMENTS

2015/0193187 A1    7/2015  Kimn et al.
2017/0213389 A1*   7/2017  Han .................... H04N 5/44591

(Continued)

FOREIGN PATENT DOCUMENTS

CN    105187945 A    12/2015
CN    108268225 A    7/2018

(Continued)

OTHER PUBLICATIONS

European Search Report in the European application No. 19210234.1, dated Jun. 18, 2020.

(Continued)

*Primary Examiner* — Christopher E Leiby
(74) *Attorney, Agent, or Firm* — Syncoda LLC; Feng Ma (57) ABSTRACT

A method for screen projection includes, wherein a target application is set to be displayed in a first mode and subjected to screen projection, after a display mode of a first screen is switched from the first mode to a second mode, an application interface of the target application is kept displayed in the first mode, the second mode being a portrait mode in response to that the first mode is a landscape mode, or, the second mode being a landscape mode in response to that the first mode is a portrait mode; projection data of the target application is acquired; and the projection data is transmitted to a second screen to which the screen projection is directed to.

17 Claims, 4 Drawing Sheets

(58) Field of Classification Search
CPC ......... G09G 2370/042; G09G 2370/16; G09G 2354/00; G09G 2340/0492
See application file for complete search history.

(56) References Cited

U.S. PATENT DOCUMENTS

| | | |
|---|---|---|
| 2017/0255442 A1 | 9/2017 | Kim et al. |
| 2018/0070122 A1* | 3/2018 | Baek .............. H04N 21/440263 |
| 2018/0070389 A1* | 3/2018 | Morgan ................... G09G 5/12 |
| 2019/0038260 A1 | 2/2019 | Lee et al. |

FOREIGN PATENT DOCUMENTS

| | | |
|---|---|---|
| CN | 108446085 A | 8/2018 |
| CN | 108958864 A | 12/2018 |
| TW | 201918062 A | 5/2019 |

OTHER PUBLICATIONS

"Screen rotation principle and flow analysis in Android6.0 development"; Reprinted at 10:59:56 on Nov. 24, 2017 by The future Winnie her father; https://www.jb51.net/article/128988.htm.
First Office Action of the Chinese application No. 201910802713.2, dated Jan. 27, 2021.

* cited by examiner

METHOD AND DEVICE FOR SCREEN PROJECTION, TERMINAL AND STORAGE MEDIUM

CROSS-REFERENCE TO RELATED APPLICATION

This application claims priority to Chinese patent application No. 201910802713.2 filed on Aug. 28, 2019, the disclosure of which is hereby incorporated by reference in its entirety.

BACKGROUND

Screen projection refers to projecting an image from a screen projection device to an external device to enable the external device to synchronously display the image of the screen projection device. Through a screen projection technology, an image displayed by a device (for example, a mobile phone and a pad) with a smaller screen may be projected onto a display device with a larger screen (for example, a television and a vehicle-mounted multimedia display screen), thereby achieving better viewing and facilitating sharing the image with multiple users.

SUMMARY

The present disclosure generally relates to the technical field of terminals, and more specifically to a method and device for screen projection, a terminal and a storage medium.

This summary is provided to introduce a selection of aspects of the present disclosure in a simplified form that are further described below in the Detailed Description. This summary is not intended to identify key features or essential features of the claimed subject matter, nor is it intended to be used to limit the scope of the claimed subject matter.

According to a first aspect of embodiments of the present disclosure, a method for screen projection is provided, after a target application is set to be displayed in a first mode and subjected to screen projection, the method including that:

after a display mode of a first screen is switched from the first mode to a second mode, an application interface of the target application is kept displayed in the first mode, the second mode being a portrait mode in response to that the first mode is a landscape mode, or, the second mode being a landscape mode in response to that the first mode is a portrait mode;

projection data of the target application is acquired; and the projection data is transmitted to a second screen to which the screen projection is directed to.

According to a second aspect of the embodiments of the present disclosure, a terminal is provided, which may include:

a processor; and a memory configured to store an instruction executable for the processor, wherein the processor may be configured to:

after a display mode of a first screen is switched from the first mode to a second mode, keep an application interface of the target application to be displayed in the first mode, the second mode being a portrait mode in response to that the first mode is a landscape mode, or, the second mode being a landscape mode in response to that the first mode is a portrait mode;

acquire projection data of the target application; and transmit the projection data to a second screen to which the screen projection is directed to.

According to a third aspect of the embodiments of the present disclosure, a non-transitory computer-readable storage medium is provided, the storage medium has stored an instruction, when executed by a processor of a terminal, enabling the terminal to execute the operations of any abovementioned method for screen projection.

It is to be understood that the above general descriptions and detailed descriptions below are only exemplary and explanatory and not intended to limit the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Terms used in the present disclosure are only adopted for the purpose of describing specific embodiments but not intended to limit the present disclosure. It is also to be understood that term "and/or" used in the present disclosure refers to and includes one or any or all possible combinations of multiple associated items that are listed.

It is to be understood that "first," "second" and similar terms used in the specification and claims of the present disclosure are not to represent any sequence, number or importance but only to distinguish different parts. Likewise, similar terms such as "a/an," "the" and a plural form do not represent a number limit but represent "at least one". Terms like "include" or "comprise" refer to that an element or object appearing before "include" or "comprise" covers an element or object and equivalent thereof listed after "include" or "comprise" and does not exclude another element or object.

A commonly used approach of processing screen projection includes mirroring projection, where all the contents displayed on a screen projection device are completely projected onto an external device to make the contents displayed on the external device fully consistent with the contents displayed on the screen projection device. However, a lot of inconvenience is brought by such completely consistent displaying and thus such a manner of processing screen projection needs to be improved.

Figure 1:
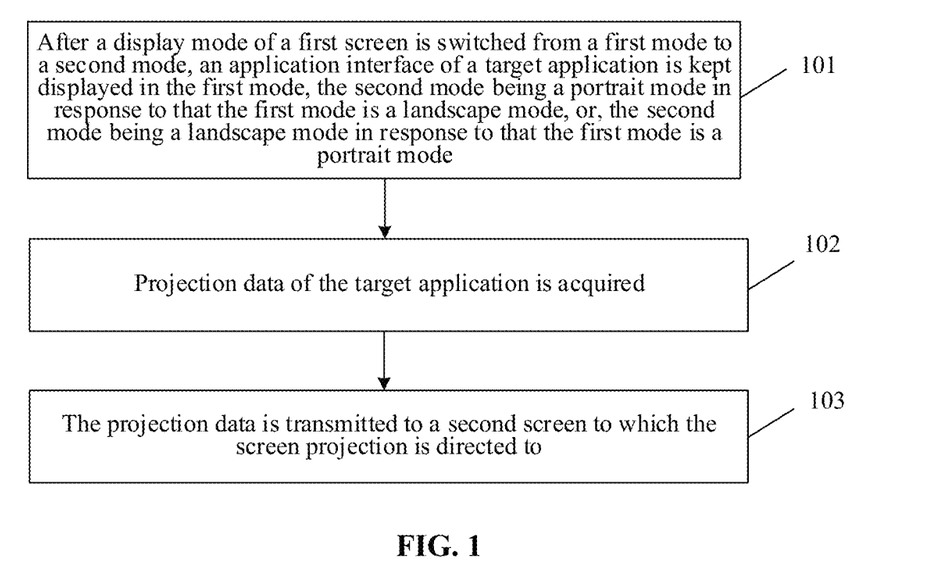
FIG. 1 is a flowchart illustrating a method for screen projection according to some embodiments of the present disclosure.

FIG. 1 is a flowchart illustrating a method for screen projection according to some embodiments of the present disclosure. As shown in FIG. 1, after a target application is set to be displayed in a first mode and subjected to screen projection, the method includes the following operations.

In operation 101, after a display mode of a first screen is switched from the first mode to a second mode, an application interface of the target application is kept displayed in the first mode; the second mode is a portrait mode in response to that the first mode is a landscape mode, or, the second mode is a landscape mode in response to that the first mode is a portrait mode.

In operation 102, projection data of the target application is acquired.

In operation 103, the projection data is transmitted to a second screen to which the screen projection is directed to.

Here, the method is applied to a terminal. The terminal may be a mobile terminal, a desktop computer, a smart home device and the like. The mobile terminal may be a mobile phone, a pad or a laptop. The smart home device may be a television and the like. It may be understood that the terminal may include the first screen, the first screen of the terminal may be projected to the second screen, and part or all of data of the first screen may be displayed on the second screen, thereby implementing mirroring projection of the projection data from the first screen to the second screen.

It may be understood that two display modes may be adopted for a display page of the first screen, one being a landscape mode and the other being a portrait mode, and the two display modes may be switched therebetween.

Here, the landscape mode may be a display mode in which a long-side direction of the terminal is a left-right direction and a wide-side direction is a top-bottom direction. The portrait mode may be a display mode in which the long-side direction of the terminal is the top-bottom direction and the wide-side direction is the left-right direction.

It is to be further explained that, if the second screen to which screen projection is directed to is suitable for viewing in the landscape mode, then the first mode may be the landscape mode and the second mode may be the portrait mode, while, if the second screen to which the screen projection is directed to is suitable for viewing in the portrait mode, then the first mode may be the portrait mode and the second mode may be the landscape mode.

In such a manner, after the target application is set to be displayed in the first mode and subjected to screen projection and after the display mode of the first screen is switched from the first mode to the second mode, the application interface of the target application may be kept displayed in the first mode and then the application interface of the target application may be kept displayed in the first mode on the second screen to which the screen projection is directed to, so that a display mode of the application interface of the target application in a projection state on the second screen is prohibited from being changed along with the change of the display mode of the first screen so as to ensure that the display mode of the second screen is stable, that is, the second screen may be kept in a proper display mode, which is favorable for a viewing experience on the second screen.

The application interface of the target application in the projection state may be kept displayed in the first mode when the display mode of the first screen is switched from the first mode to the second mode and, meanwhile, a display page other than the application interface of the target application in the first screen still enters the second mode, so that a user may conveniently use, for example, watch or operate, the display page other than the application interface of the target application.

In some embodiments, operation 101 may further include that:

after the display mode of the first screen is switched from the first mode to the second mode, the target application is prohibited from updating a direction configuration instruction, and the direction configuration instruction is maintained to keep the application interface of the target application to be displayed in the first mode.

Here, the direction configuration instruction may be configured to control the display mode of the target application.

It may be understood that, after the display mode of the first screen is switched from the first mode to the second mode, the content of the direction configuration instruction accordingly indicates an update from the first mode to the second mode. For example, if the first mode is the landscape mode, the content of the direction configuration instruction accordingly indicates that the display mode of the application interface is the landscape mode; and if the second mode is the portrait mode, the content of the direction configuration instruction accordingly indicates that the display mode of the application interface is the portrait mode.

In the embodiment, the application interface of the target application is kept displayed in the first mode by prohibiting the target application from updating the direction configuration instruction, namely by maintaining the direction configuration instruction. In such a manner, it is only necessary to ban a related code of the direction configuration instruction, which is easy to operate, less to calculate, high in speed and free of screen-turning animation. Therefore, keeping displaying the application interface of the target application in the first mode in such a manner may provide a better user experience.

Specifically, the operation that the target application is prohibited from updating the direction configuration instruction may include at least one of following operations:

the target application is directly prohibited from updating the direction configuration instruction; and an operating system of the first screen is prohibited from transmitting a direction update notification to the target application, the direction update notification being configured to trigger the target application to update the direction configuration instruction.

As another optional embodiment, operation 101 may further include that:

after the display mode of the first screen is switched from the first mode to the second mode, a system is prohibited from generating a direction configuration update instruction for the target application to make the application interface of the target application kept displayed in the first mode.

In the embodiment, the system may be prohibited from generating the direction configuration update instruction for the target application, so that the direction configuration instruction of the target application is still a direction configuration instruction that exists before the display mode of the first screen is switched from the first mode to the second mode, and the application interface of the target application may be kept displayed in the first mode.

The application interface of the target application may also be kept displayed in the first mode in another manner after the display mode of the first screen is switched from the first mode to the second mode as long as the application interface of the target application in the projection state is kept displayed in the first mode and does not change with change of the display mode of the first screen. There are no limits made to any implementations herein.

In some embodiments, the method may further include that:

when it is detected that a status of the first screen changes from a first status to a second status, an instruction for triggering the first screen to switch from the first mode to the second mode is generated.

Here, a sensor configured to detect the status of the first screen may be a gyroscope mounted in the terminal. The gyroscope may detect whether an status of the terminal is a horizontal status or a vertical status. Under a normal circumstance, a display mode corresponding to the horizontal status is the landscape mode, and a display mode corresponding to the vertical status is the portrait mode.

In the embodiments, whether to change the display mode of the first screen may be determined by determining the status of the first screen, thereby determining whether the display mode of the first screen is switched from the first mode to the second mode or not.

When it is detected that the first screen is triggered to enter a predetermined page of which a default display mode is the second mode, the instruction for triggering the first screen to switch from the first mode to the second mode is generated.

Here, a second manner for detecting whether the first screen is switched from the first mode to the second mode is determined based on whether the first screen enters the predetermined page of which the default display mode is the second mode. It may be understood that the default display mode is set for the predetermined page. The predetermined page may be a system page or a specific application interface. The system page may include a home page of the system, and the home page may be a desktop. It may be learned that a default display mode of the home page may be the portrait mode. The specific application interface may include a video display page of an application program. It may be known that a default display mode of some video display pages may be the landscape mode.

In the embodiment, whether the first screen enters the predetermined page of which the default display mode is the second mode is determined to determine switching of the display mode of the first screen, thereby determining whether the first screen is being switched from the first mode to the second mode or not.

Determining that the first screen is switched from the first mode to the second mode in the above two manners can automatically determine that the display mode of the first screen is switched from the first mode to the second mode, which is high in accuracy and universality and is low in misjudgment rate.

In some embodiments, operation 101 may further include that: after the display mode of the first screen is switched from the first mode to the second mode, the application interface of the target application is kept displayed in the first mode in a predetermined region of the first screen, a display area of the predetermined region being smaller than a display area of the first screen.

The predetermined region may be a region at a left upper part of the first screen, or a region at a right upper part of the first screen. In a word, the predetermined region is within the first screen, and the display area of the predetermined region is smaller than the display area of the first screen.

Here, the predetermined region may be a floating window, and the application interface of the target application may be displayed in the floating window. It may be understood that the floating window may float on a display interface of the first screen and the floating window may be located in different regions of the first screen, for example, at a left upper corner of the first screen or at a right upper corner of the first screen.

It may be understood that displaying in the predetermined region may be called as displaying in a floating window. Displaying in the first screen may be called as full-screen displaying or complete-screen displaying.

The present display mode of the application interface of the target application in the projection state may be directly viewed in the predetermined region in the embodiment, that is, the present display mode of the application interface in the floating window may be directly viewed by displaying the floating window in the embodiment, and an unreasonable display mode can be timely adjusted, so that the user experience is improved.

It is to be further explained that, as another optional embodiment, before operation 101, an input operation acting on the first screen is detected, the input operation being configured to keep the application interface of the target application to be displayed in the first mode; and after the display mode of the first screen is switched from the first mode to the second mode, the application interface of the target application is kept displayed in the first mode based on the input operation.

Here, the operation that the input operation acting on the first screen is detected may include that: various operations over a User Interface (UI) of the first screen are detected to determine the input operation.

The input operation may include a swipe operation, a click operation, a long press operation and the like. The click operation may further include a single-click operation, a multi-click operation and the like. Here, the input operation is not limited as long as the application interface of the target application in the projection state can be controlled to be kept displayed in the first mode.

Figure 2:
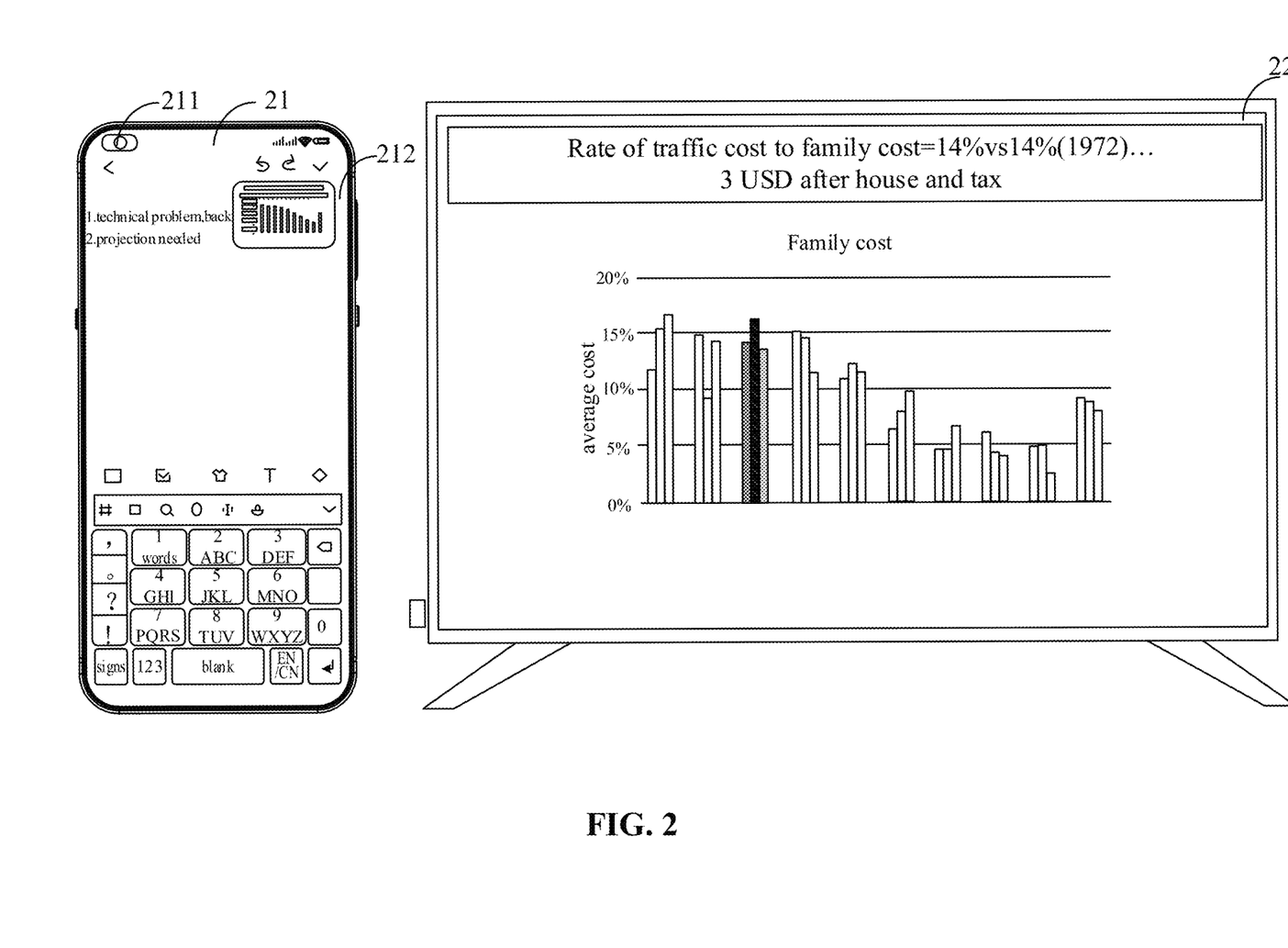
FIG. 2 is a schematic diagram illustrating a screen projection scenario according to an exemplary specific embodiment.

Referring to FIG. 2, in some embodiments, the input operation may act on a predetermined key 211 of the first screen 21. The predetermined key 211 is clicked to control the application interface of the target application in the projection state to be kept displayed in the first mode; and the projection data of the target application is acquired, and the projection data is transmitted to the second screen 22 to which the screen projection is directed to.

Here, the predetermined key 211 may be a virtual control or a physical key.

Accordingly, operation 101 may further include that: after the display mode of the first screen is switched from the first mode to the second mode, the application interface of the target application is kept displayed in the first mode in the predetermined region of the first screen based on the input operation.

Specifically, referring to FIG. 2 again, the application interface of the target application may be moved into the predetermined region 212 based on the input operation. In such case, the first screen of the terminal returns to the home page of the system. Here, the home page of the system is displayed in the second mode, while the application interface of the target application in the predetermined region 212 is still kept displayed in the first mode, so that the second screen to which the screen projection is directed to displays the application interface of the target application according to the first mode.

Here, a projection control may control the target application to be displayed in the first mode and subjected to screen projection, namely a projection instruction is transmitted. In addition, the projection control may further control the application interface of the target application to be displayed in a floating window in the first mode. Here, the projection control may be displayed in a status bar of the terminal such that a user may conveniently and rapidly use the projection control.

Furthermore, in some embodiments, the method may further include that: information indicative of a difference between display modes is recorded. The information indicative of a difference between display modes is used to represent a difference between the display mode of the first screen and the display mode of the target application.

Here, the information indicative of a difference between display modes may be represented by a numeric code. For example, "00" represents that both the display mode of the first screen and the display mode of the target application are the first mode; "01" represents that the display mode of the first screen is the first mode and the display mode of the target application is the second mode; "10" represents that both the display mode of the first screen and the display mode of the target application are the second mode; and "11" represents that the display mode of the first screen is the second mode and the display mode of the target application is the first mode.

Of course, the information indicative of a difference between display modes may be represented by a letter. For example, "A" represents that both the display mode of the first screen and the display mode of the target application are the first mode; "B" represents that the display mode of the first screen is the first mode and the display mode of the target application is the second mode; "C" represents that both the display mode of the first screen and the display mode of the target application are the second mode; and "D" represents that the display mode of the first screen is the second mode and the display mode of the target application is the first mode.

In a word, there are four conditions for the difference between the display mode of the first screen and the display mode of the target application.

As another optional embodiment, the operation that the information indicative of a difference between display modes is recorded may include that: the display mode of the target application is recorded. In this way, the display mode of the target application may be subsequently invoked conveniently.

Furthermore, in some embodiments, the method may further include that: an exit operation for screen projection directed to the second screen is detected; the target application is controlled to exit from a projection state based on the exit operation; and after the target application exits from the projection state, the application interface of the target application is displayed on the whole first screen in the first mode.

In some examples, the situation that the target application exits from the projection state may be understood as that the target application exits from the state of being displayed in a floating window. The operation that the application interface of the target application is displayed on the whole first screen in the first mode according to the recorded information indicative of a difference between display modes may be understood as that the application interface of the target application is displayed in the full-screen display manner in the first mode according to the recorded information indicative of a difference between display modes.

It is to be noted that the exit operation may also be an operation acting on the predetermined key 211 of the first screen. The predetermined key 211 is clicked again to exit from the screen projection directed to the second screen.

The exit operation may also be an operation acting on another key of the first screen. The exit operation is not limited herein.

In some examples, the operation that the application interface of the target application is displayed on the whole first screen in the first mode according to the recorded information indicative of a difference between display modes after the target application exits from the projection state may be understood as that the application interface of the target application is displayed on the whole first screen in the first mode when it is indicated according to the recorded information indicative of a difference between display modes that the display mode of the application interface of the target application is different from the display mode of the first screen after the target application exits from the projection state. In such a case, when the application interface of the target application exits from screen projection and is displayed on the first screen in the full-screen display manner, the application interface of the target application, which is required to be displayed in the first mode on the first screen, will not be displayed in the second mode due to the fact that the present display mode of the first screen is different from the display mode of the application interface of the target application, and thus unfriendly displaying of the application interface of the target application on the first screen during projection exit can be reduced.

Furthermore, the present disclosure also provides a specific embodiment to further understand the method for screen projection provided in the embodiments of the present disclosure.

For example, a terminal with the first screen is a mobile terminal such as a mobile phone, and a terminal with the second screen is a television. Here, a display mode suitable for the television is the landscape mode. Therefore, the situation that the first mode is the landscape mode and the second mode is the portrait mode is taken as an example below.

Based on a mirroring projection function, a virtual screen may turn along with a main screen. The landscape mode of the mobile phone is more suitable for the second screen of the television due to the scale of the second screen, while, the portrait mode is more suitable for the mobile phone in daily use. If a landscape task is displayed on the second screen of the television and a portrait task is run in the mobile phone, the landscape task on the second screen of the television may be forcibly turned to be displayed in the portrait mode, which may bring influence to user experience in viewing the projected screen.

Next, how to avoid the virtual screen from turning along with the main screen under the mirroring projection function and provide a better user experience in screen projection will be described.

Specifically, referring to FIG. 2, when screen projection is performed on the application interface of the target application in the landscape mode, the mobile phone is expected to enter a floating-window projection mode, but the mobile phone may return to a home interface of a system after entering the floating-window projection mode. Since a default display mode of the home interface is the portrait mode, the system may turn to the portrait mode. However, for preventing the application interface played on the television from changing along with a direction change of the main screen, the application interface played on the television is prohibited from changing along with the direction change of the main screen by use of the method for screen projection of the embodiment.

Here, the floating-window projection mode may be understood as that the projection mode that the mobile phone is to enter into is controlled by clicking the projection control in the abovementioned embodiment. In the embodiment, in the floating-window projection mode, the mobile phone may display the target application in the first mode and implement screen projection, and after the display mode of the first screen is switched from the first mode to the second mode, the application interface of the target application is still kept displayed in the floating window in the first mode.

Here, the main screen may be understood as the first screen 21 in the abovementioned embodiment, i.e., the screen of the mobile phone; and the virtual screen may be understood as the second screen 22 in the abovementioned embodiment, i.e., the screen of the television.

According to the embodiment, the predetermined key 211 on the first screen of the mobile phone may be clicked to enter the floating-window projection mode, and in such case, the system may display the application interface of the target application in the floating window. Here, the floating window may be understood as the predetermined region 212 in the abovementioned embodiment.

When the screen turns in the floating-window projection mode, the direction of the virtual screen is controlled and prohibited from changing along with the direction change of the main screen, and the direction of the virtual screen is recorded.

Here, the operation that the direction of the virtual screen is controlled may include that: after a direction of the main screen is changed to a portrait direction, the home interface of the system is displayed on the main screen, the default display mode of the home interface of the system being the portrait mode. The mobile phone may prohibit the system from updating a configuration file (config) of the target application in the projection state in the floating window and still keep the landscape mode, and in such a manner, the display mode of the application interface of the application program subjected to the screen projection in the floating window is kept to be the landscape mode, so that the application interface on the television is prohibited from changing along with a change in the display mode of the mobile phone. Here, config may be understood as the direction configuration instruction in the abovementioned embodiment.

In addition, the operation that the direction of the virtual screen is controlled may further include that: after the direction of the main screen is changed to the portrait direction, the target application in the projection state in the floating window is prohibiting from receiving a notification about a configuration information update event (onConfigurationChanged) to make the target application believe that the main screen is still in the landscape mode. In such a manner, the display mode of the application interface of the application program subjected to screen projection in the floating state may also be kept to be the landscape mode, so that the application interface on the television is prohibited from changing along with the change in the display mode of the mobile phone. Here, onConfigurationChanged may be understood as the direction update notification in the abovementioned embodiment.

In the abovementioned manners, screen-turning animations may be eliminated from the floating-window projection so as to avoid influence from turning of the main screen to the display mode of the application interface in the floating window.

Furthermore, during exit from the floating-window projection mode, according to the recorded display mode of the virtual screen, i.e., the recorded information indicative of a difference between display modes in the abovementioned embodiment, the application interface of the target application is still displayed in the landscape mode when the mobile phone is operated in the portrait direction. Then, the sensor is applied for detection, and turning is performed only if the sensor detects a portrait direction. Therefore, friendly displaying on the screen of the mobile phone during exit is ensured.

According to the embodiment, the problem that the virtual screen may turn along with the main screen under the mirroring projection function is solved, and a better projection experience is provided for the user.

Figure 3:
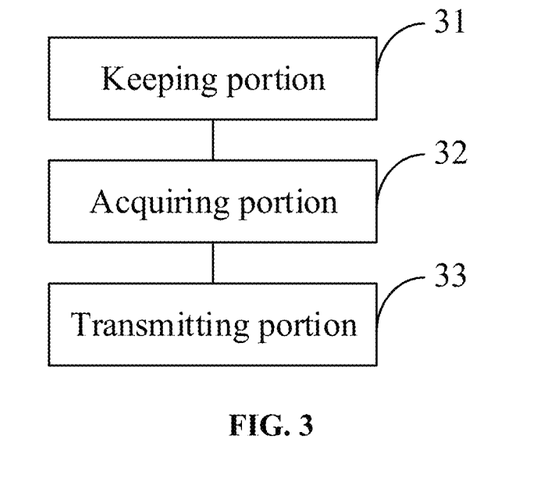
FIG. 3 is a block diagram of a device for screen projection according to some embodiments of the present disclosure.

FIG. 3 illustrates a device for screen projection according to some embodiments of the present disclosure.

Referring to FIG. 3, the device includes a keeping portion 31, an acquiring portion 32 and a transmitting portion 33.

The keeping portion 31 is configured to, after a target application is set to be displayed in a first mode and subjected to screen projection and after a display mode of a first screen is switched from the first mode to a second mode, keep an application interface of the target application to be displayed in the first mode, the second mode being a portrait mode in response to that the first mode is a landscape mode, or, the second mode being a landscape mode in response to that the first mode is a portrait mode.

The acquiring portion 32 is configured to acquire projection data of the target application.

The transmitting portion 33 is configured to transmit the projection data to a second screen to which the screen projection is directed to.

In some embodiments, the keeping portion 31 may include:

a prohibiting submodule, configured to, after the display mode of the first screen is switched from the first mode to the second mode, prohibit the target application from updating a direction configuration instruction and maintain the direction configuration instruction to keep the application interface of the target application to be displayed in the first mode.

In some embodiments, the prohibiting submodule may be configured to execute at least one of the following operations of:

directly prohibiting the target application from updating the direction configuration instruction; and prohibiting an operating system of the first screen from transmitting a direction update notification to the target application, the direction update notification being configured to trigger the target application to update the direction configuration instruction.

In some embodiments, the device further may include a generation portion, configured to execute at least one of the following operations:

when it is detected that a status of the first screen changes from a first status to a second status, generating an instruction for triggering the first screen to switch from the first mode to the second mode; and when it is detected that the first screen enters a predetermined page of which a default display mode is the second mode, generating the instruction for triggering the first screen to switch from the first mode to the second mode.

In some embodiments, the keeping portion 31 may be further configured to:

after the display mode of the first screen is switched from the first mode to the second mode, keep the application interface of the target application to be displayed in the first mode in a predetermined region of the first screen, a display area of the predetermined region being smaller than a display area of the first screen.

In some embodiments, the device further may include:

a recording portion, configured to record a display mode of the target application.

In some embodiments, the device further may include:

a detecting portion, configured to detect an exit operation for the screen projection directed to the second screen;

a controlling portion, configured to control the target application to exit from a projection state based on the exit operation; and a displaying portion, configured to, after the target application exits from the projection state, display the application interface of the target application on the whole first screen in the first mode.

With respect to the device in the above embodiment, the specific manners for performing operations for individual portions therein have been described in detail in the embodiment regarding the method, which will not be elaborated herein.

Figure 4:
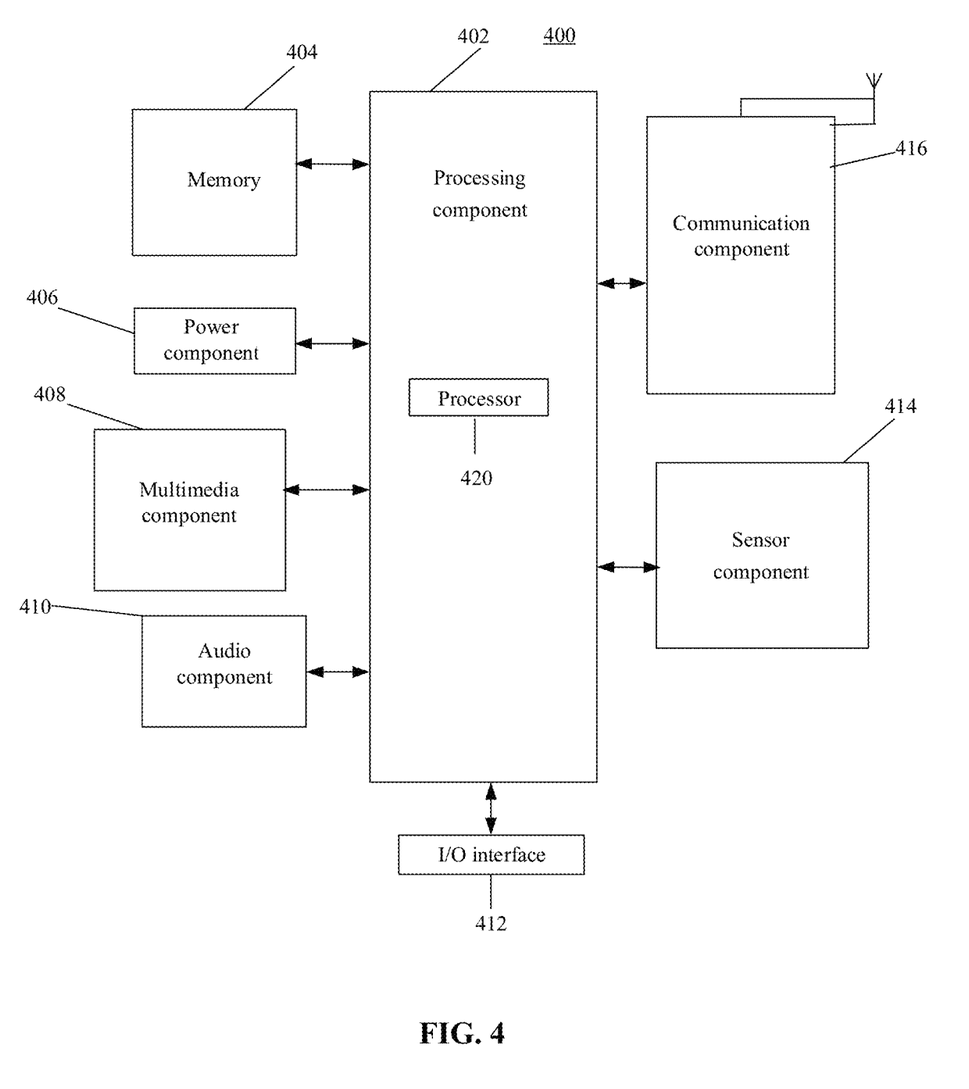
FIG. 4 is a block diagram of a terminal according to some embodiments of the present disclosure.

FIG. 4 is a block diagram of a terminal 400 according to some embodiments of the present disclosure. For example, the terminal 400 may be a mobile phone, a computer, a digital broadcast terminal, a messaging device, a gaming console, a tablet, a medical device, exercise equipment, a personal digital assistant and the like.

Referring to FIG. 4, the terminal 400 may include one or more of the following components: a processing component 402, a memory 404, a power component 406, a multimedia component 408, an audio component 410, an Input/Output (I/O) interface 412, a sensor component 414, and a communication component 416.

The processing component 402 is typically configured to control overall operations of the terminal 400, such as the operations associated with display, telephone calls, data communications, camera operations, and recording operations. The processing component 402 may include one or more processors 420 to execute instructions to perform all or part of the operations in the abovementioned method. Moreover, the processing component 402 may include one or more portions which facilitate interaction between the processing component 402 and other components. For instance, the processing component 402 may include a multimedia module to facilitate interaction between the multimedia component 408 and the processing component 402.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms.

The memory 404 is configured to store various types of data to support the operation of the device 400. Examples of such data include instructions for any application programs or methods operated on the terminal 400, contact data, phonebook data, messages, pictures, video, etc. The memory 404 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 406 is configured to provide power for various components of the terminal 400. The power component 406 may include a power management system, one or more power supplies, and other components associated with generation, management and distribution of power for the terminal 400.

The multimedia component 408 may include a screen for providing an output interface between the terminal 400 and a user. In some examples, the screen may include a Liquid Crystal Display (LCD) and a Touch Panel (TP). In some embodiments, organic light-emitting diode (OLED) or other types of displays can be employed.

If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some examples, the multimedia component 408 may include a front camera and/or a rear camera. The front camera and/or the rear camera may receive external multimedia data when the device 400 is in an operation mode, such as a photographing mode or a video mode. Each of the front camera and the rear camera may be a fixed optical lens system or have focusing and optical zooming capabilities.

The audio component 410 is configured to output and/or input an audio signal. For example, the audio component 410 includes a Microphone (MIC), and the MIC is configured to receive an external audio signal when the terminal 400 is in the operation mode, such as a call mode, a recording mode and a voice recognition mode. The received audio signal may further be stored in the memory 404 or transmitted through the communication component 416. In some examples, the audio component 410 may further include a speaker configured to output the audio signal.

The I/O interface 412 is configured to provide an interface between the processing component 402 and a peripheral interface portion, and the peripheral interface portion may be a keyboard, a click wheel, a button and the like. The button may include, but not limited to: a home button, a volume button, a starting button and a locking button.

The sensor component 414 may include one or more sensors configured to provide status assessment in various aspects for the terminal 400. For instance, the sensor component 414 may detect an on/off status of the device 400 and relative positioning of components, such as a display and small keyboard of the terminal 400, and the sensor component 314 may further detect a change in a position of the terminal 400 or a component of the terminal 400, presence or absence of contact between the user and the terminal 400, orientation or acceleration/deceleration of the terminal 400 and a change in temperature of the terminal 400. The sensor component 414 may include a proximity sensor configured to detect presence of an object nearby without any physical contact. The sensor component 414 may also include a light sensor, such as a Complementary Metal Oxide Semiconductor (CMOS) or Charge Coupled Device (CCD) image sensor, configured for use in an imaging APP. In some examples, the sensor component 414 may also include an acceleration sensor, a gyroscope sensor, a magnetic sensor, a pressure sensor or a temperature sensor.

The communication component 416 is configured to facilitate wired or wireless communication between the terminal 400 and other equipment. The terminal 300 may access a communication-standard-based wireless network, such as a Wireless Fidelity (Wi-Fi) network, a 2nd-Generation (2G), 3rd-Generation (3G), $4^{th}$-Generation (4G), or $5^{th}$-Generation (5G) network or a combination thereof. In some embodiments of the present disclosure, the communication component 416 is configured to receive a broadcast signal or broadcast associated information from an external broadcast management system through a broadcast channel. In some embodiments of the present disclosure, the communication component 416 may further include a Near Field Communication (NFC) module to facilitate short-range communication. For example, the NFC module may be implemented based on a Radio Frequency Identification (RFID) technology, an Infrared Data Association (IrDA) technology, an Ultra-WideBand (UWB) technology, a Bluetooth (BT) technology and another technology.

In some embodiments of the present disclosure, the terminal 400 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In some embodiments of the present disclosure, there is also provided a non-transitory computer-readable storage medium including an instruction, such as the memory 404 including an instruction, and the instruction may be executed by the processor 420 of the terminal 400 to implement the abovementioned method. For example, the non-transitory computer-readable storage medium may be a ROM, a Random-Access Memory (RAM), a Compact Disc Read-Only Memory (CD-ROM), a magnetic tape, a floppy disc, an optical data storage device and the like.

A non-transitory computer-readable storage medium can have instructions stored thereon, which executable by a processor of a terminal to enable the terminal to execute the methods of the embodiments described above.

Other implementation solutions of the present disclosure will be apparent to those skilled in the art from consideration of the specification and practice of the present disclosure. This disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for screen projection, wherein a target application is set to be displayed in a first mode and subject to screen projection, the method comprising:
   after a display mode of a first screen is switched from the first mode to a second mode, keeping displaying the target application in the first mode, wherein the second mode is a portrait mode in response to that the first mode is a landscape mode, or, the second mode is a landscape mode in response to that the first mode is a portrait mode;
   displaying a display page other than the target application in the first screen in the second mode;
   acquiring projection data of only the target application; and
   transmitting the projection data to a second screen to which the screen projection is directed to;
   wherein the keeping displaying the target application in the first mode comprises:
   keeping displaying the target application in the first mode in a predetermined region of the first screen, wherein the predetermined region is a floating window and a display area of the predetermined region is smaller than a display area of the first screen.

2. The method of claim 1, wherein the keeping displaying the target application in the first mode after the display mode of the first screen is switched from the first mode to the second mode comprises:
   after the display mode of the first screen is switched from the first mode to the second mode, prohibiting the target application from updating a direction configuration instruction, and maintaining the direction configuration instruction to keep the target application to be displayed in the first mode,
   wherein the floating window overlaps the display page other than the target application in the first screen.

3. The method of claim 2, wherein the prohibiting the target application from updating the direction configuration instruction comprises at least one of following operations:
   directly prohibiting the target application from updating the direction configuration instruction; or
   prohibiting an operating system of the first screen from transmitting a direction update notification to the target application, wherein the direction update notification is configured to trigger the target application to update the direction configuration instruction.

4. The method of claim 1, further comprising at least one of following operations:
   when it is detected that a status of the first screen changes from a first status to a second status, generating an instruction for triggering the first screen to switch from the first mode to the second mode; or
   when it is detected that the first screen is triggered to enter a predetermined page of which a default display mode is the second mode, generating the instruction for triggering the first screen to switch from the first mode to the second mode.

5. The method of claim 1, further comprising:
   recording a display mode of the target application.

6. The method of claim 1, further comprising:
   detecting an exit operation for the screen projection directed to the second screen;
   controlling the target application to exit from a projection state based on the exit operation; and
   after the target application exits from the projection state, displaying the target application on the whole first screen in the first mode.

7. A non-transitory computer-readable storage medium having instructions stored thereon for execution by a processor of a terminal to enable the terminal to implement the method for screen projection of claim 1.

8. A computer system implementing the method of claim 1, wherein the target application is kept displayed in the first mode and then the target application is kept displayed in the first mode on the second screen to which the screen projection is directed to, such that a display mode of the target application in a projection state on the second screen is prevented from being changed along with the change of the display mode of the first screen, to thereby ensure that the display mode of the second screen is stable.

9. The computer system of claim 8, wherein the target application in its projection state is kept displayed in the first mode in a case that the display mode of the first screen is switched from the first mode to the second mode.

10. The computer system of claim 9, wherein a display page other than the target application in the first screen still enters the second mode, to facilitate a user conveniently watching or operating the display page other than the target application, improving both user experience both on the second screen and the first screen.

11. The computer system of claim 10, wherein the computer system comprises a mobile terminal having the first screen, and a television having the second screen.

12. A device for screen projection, comprising:
a processor; and
memory configured to store an instruction executable for the processor,
wherein the processor is configured to:
after a target application is set to be displayed in a first mode and subject to screen projection and after a display mode of a first screen is switched from the first mode to a second mode, keep the target application to be displayed in the first mode in a predetermined region of the first screen, wherein a display area of the predetermined region is smaller than a display area of the first screen, wherein the second mode is a portrait mode in response to that the first mode is a landscape mode, or, the second mode is a landscape mode in response to that the first mode is a portrait mode;
acquire projection data of only the target application; and
control a transceiver to transmit the projection data to a second screen to which the screen projection is directed to;
display a display page other than the target application in the first screen in the second mode.

13. The device of claim 12, wherein the processor is further configured to:
after the display mode of the first screen is switched from the first mode to the second mode, prohibit the target application from updating a direction configuration instruction and maintain the direction configuration instruction to keep the target application to be displayed in the first mode,
wherein the floating window overlaps the display page other than the target application in the first screen.

14. The device of claim 13, wherein the processor is further configured to execute at least one of following operations:
directly prohibiting the target application from updating the direction configuration instruction; or
prohibiting an operating system of the first screen from transmitting a direction update notification to the target application, wherein the direction update notification is configured to trigger the target application to update the direction configuration instruction.

15. The device of claim 12, wherein the processor is further configured to execute at least one of following operations:
when it is detected that a status of the first screen changes from a first status to a second status, generating an instruction for triggering the first screen to switch from the first mode to the second mode; or
when it is detected that the first screen enters a predetermined page of which a default display mode is the second mode, generating the instruction for triggering the first screen to switch from the first mode to the second mode.

16. The device of claim 12, wherein the processor is further configured to record a display mode of the target application.

17. The device of claim 12, wherein the processor is further configured to:
detect an exit operation for the screen projection directed to the second screen;
control the target application to exit from a projection state based on the exit operation; and
after the target application exits from the projection state, display the target application on the whole first screen in the first mode.

* * * * *